(12) United States Patent
Dade

(10) Patent No.: US 8,271,564 B2
(45) Date of Patent: Sep. 18, 2012

(54) LOOKUP TABLE ARRANGEMENT AND RELATED MANAGEMENT METHOD FOR ACCOMMODATING CONCURRENT PROCESSORS

(75) Inventor: Nicolas Sebastien Dade, Santa Cruz, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 507 days.

(21) Appl. No.: 12/172,780

(22) Filed: Jul. 14, 2008

(65) Prior Publication Data

US 2010/0011028 A1      Jan. 14, 2010

(51) Int. Cl.
*G06F 7/00* (2006.01)
*G06F 17/00* (2006.01)
(52) U.S. Cl. ................ 707/999.008; 707/698
(58) Field of Classification Search .............. 707/1, 600, 707/698, 999.008; 1/1
See application file for complete search history.

(56) References Cited

U.S. PATENT DOCUMENTS

| | | | | |
|---|---|---|---|---|
| 5,983,225 | A * | 11/1999 | Anfindsen | 1/1 |
| 6,950,834 | B2 * | 9/2005 | Huras et al. | 707/610 |
| 7,424,591 | B2 * | 9/2008 | Ross | 711/170 |
| 7,657,500 | B2 * | 2/2010 | Shavit et al. | 711/216 |
| 2008/0228691 | A1 | 9/2008 | Shavit et al. | |

OTHER PUBLICATIONS

Rasmus Pagh and Flemming Friche Rodler, Cuckoo Hashing, Proceedings of the 9th European Symposium on Algorithms (Aug. 2001), vol. 2161 of Lecture Notes in Computer Science, pp. 121-133.
Rasmus Pagh and Flemming Friche Rodler, Cuckoo Hashing, Journal of Algorithms, vol. 51, Issue 2, pp. 122-144 (May 2004).
Ulfar Erlingsson et al., A Cool and Practical Alternative to Traditional Hash Tables, Proceedings of the 7th Workshop on Distributed Data and Structures (WDAS 2006), Jan. 2006.
Herilhy, M.., et al., "Chapter 13: Concurrent Hashing and Natural Parallelism ED, Maurice Herlihy; Nir Shavit" Jan. 1, 2008, The Art of Multiprocessor Programming, Elsevier & Morgan Kaufmann Publishers, XP007909739 ISBN: 9780123705914 pp. 299-327.
International Search Report,PCT/US2009/048659 dated Oct. 10, 2009.
International Preliminary Report on Patentability for counterpart International Application No. PCT/US2009/048659 mailed on Jan. 27, 2011.
Wikipedia., "Cuckoo Hashing," May 31, 2012, pp. 5, accessed at http://en.wikipedia.org/wiki/Cuckoo_hashing.

* cited by examiner

*Primary Examiner* — Tony Mahmoudi
*Assistant Examiner* — Paul Kim

(57) ABSTRACT

A system and methods of managing entries in a cuckoo hash table that is subject to manipulation by a plurality of concurrent processors are provided. The cuckoo hash table is used to maintain a plurality of keys, along with their data items, in a plurality of entries. In accordance with an operating method, a first command for the cuckoo hash table is processed, and the first command is associated with a first processor of the plurality of concurrent processors. In addition, invalid conditions associated with concurrent processing of a second command for the cuckoo hash table are prevented or minimized. The second command is associated with a second processor of the plurality of concurrent processors. As one example, the operating method manages the situation where concurrent push commands create a race condition. As another example, the operating method manages the situation where a lookup or delete command from one processor competes with a push command from another processor.

7 Claims, 7 Drawing Sheets

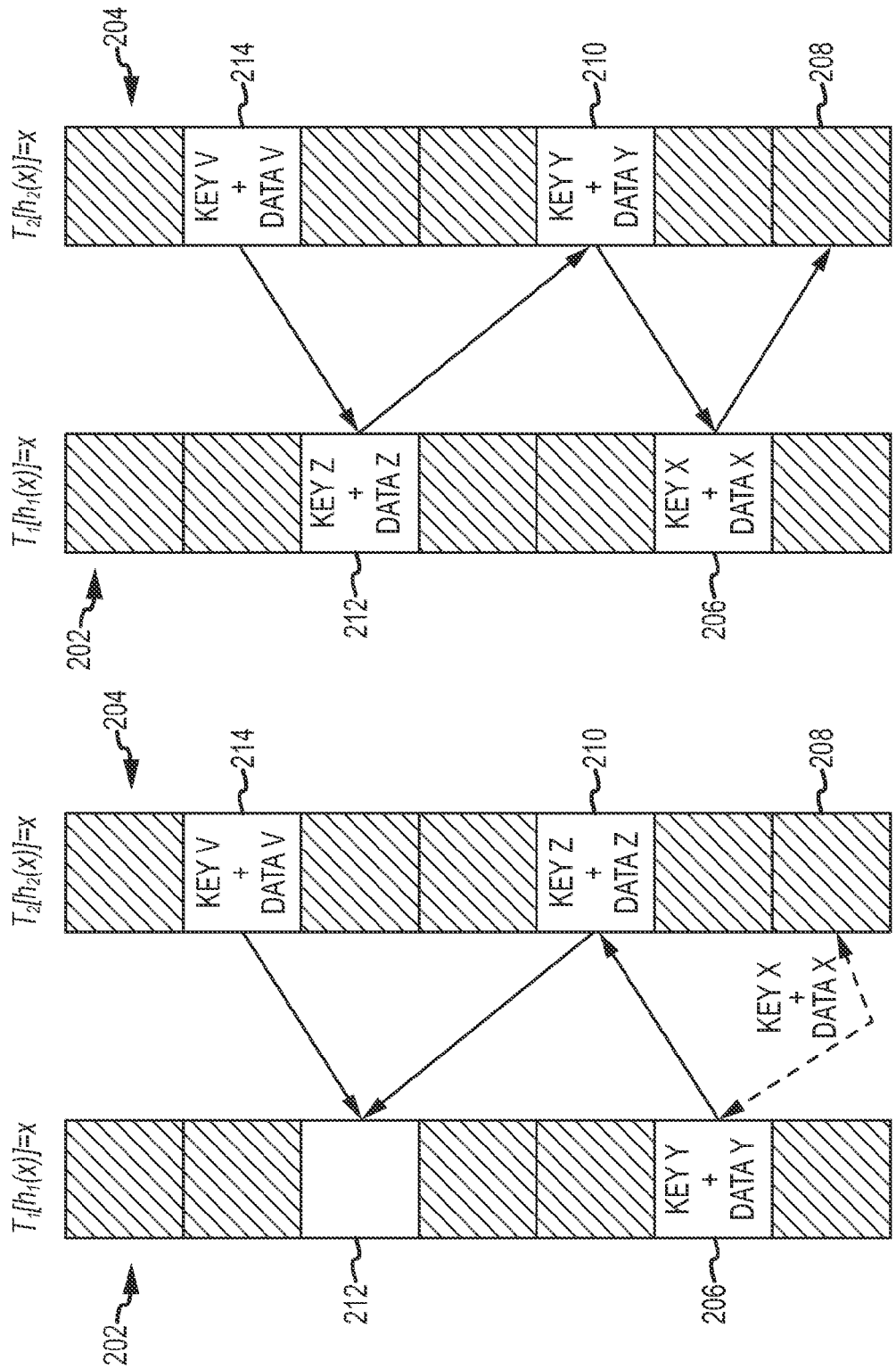

LOOKUP TABLE ARRANGEMENT AND RELATED MANAGEMENT METHOD FOR ACCOMMODATING CONCURRENT PROCESSORS

TECHNICAL FIELD

Embodiments of the subject matter described herein relate generally to lookup tables utilized for data storage and retrieval. More particularly, embodiments of the subject matter relate to a cuckoo hash table and techniques for managing associated commands from a plurality of concurrently operating processors.

BACKGROUND

The prior art is replete with known data structures, techniques, and systems related to data lookup tables and the processing of lookup queries. Data lookup techniques based upon data hashing are commonly used to handle large amounts of data, because hash-based techniques can usually be performed at a relatively high speed. A hash function can be applied to an input value to derive a corresponding output value. A hash table can be used to store data in locations (cells, slots, buckets, etc.) that are identified, labeled, or assigned based upon output values of a hashing function.

Cuckoo hashing is a known technique that can be utilized in a lookup table architecture. This technique was originally presented by Pagh and Rodler in Cuckoo Hashing, *Proceedings of the 9th European Symposium on Algorithms* (2001). Cuckoo hashing employs two hash functions and two respective hash tables ($T_1$ and $T_2$), which may be considered to be two portions or subtables of a single cuckoo hash table. Each entry is stored in a bucket of $T_1$ or a bucket of $T_2$, but never in both. FIG. 1 is a diagram of cuckoo hash tables arranged according to prior art principles. Here, the table $T_1$ is identified by reference number 102 and the table $T_2$ is identified by reference number 104. As explained by Pagh and Rodler, a given key will be hashed by the first hash function to determine its bucket in table $T_1$ and that same key will be hashed by the second hash function to determine its bucket in table $T_2$. In other words, using the same nomenclature as Pagh and Rodler, $T_1[h_1(x)]=x$ and $T_2[h_2(x)]=x$, where $h_1$ is the first hash function, $h_2$ is the second hash function, and x is the key.

In practice, therefore, a given key is hashed using the two different hash functions to obtain two possible cuckoo hash table locations or buckets (alternatively, a single hash function with multiple results can be used). Then, those buckets can be searched for the key. If the key is found in one of the two buckets, then data stored with that key can be accessed, retrieved, processed, etc. As an example, FIG. 1 illustrates that Key A can be potentially stored in its respective bucket 106 in table 102 or in its respective bucket 108 in table 104. The arrow between bucket 106 and bucket 108 indicates potential movement or pushing of Key A between bucket 106 and bucket 108. As depicted in FIG. 1, Key B has its potential locations in table 102 and table 104, Key C has its potential locations in table 102 and table 104, and Key D has its potential locations in table 102 and table 104. In practice, table 102 and/or table 104 can include a number of empty buckets 110 to accommodate the insertion of new keys (and corresponding data) and to accommodate pushing of existing keys between table 102 and table 104.

A hash function may generate the same hash value (i.e., a locator or identifier for a given bucket) for two or more different input values. In other words, given a first key $x_1$ and a second key $x_2$, $h_1(x_1)$ might equal $h_1(x_2)$. In a cuckoo hash table, collisions are handled by moving entries from one table to another. With this in mind, FIG. 2 and FIG. 3 are diagrams (used for purposes of this simplified example) that illustrate pushing of keys in cuckoo hash tables. FIG. 2 depicts the status of the first table 202 and the second table 204 at a time when an entry (Entry X, which includes Key X and corresponding data) is to be inserted. The shaded areas represent occupied or unavailable buckets in the table. As explained above, the two hash functions indicate that Entry X can be inserted into the bucket 206 of table 202 or into the bucket 208 of table 204 (but not both). This example represents an attempt to initially insert Entry X into bucket 206. The arrows in FIG. 2 and FIG. 3 indicate the manner in which the given entry can be pushed from table 202 to table 204, or vice versa. Thus, referring to FIG. 2, although Entry Y is contained in bucket 206, it may alternatively be contained in the bucket 210 of table 204. Similarly, although Entry Z is presently contained in bucket 210, it may be pushed into the bucket 212 of table 202—note that bucket 210 may contain either Entry Y or Entry Z, meaning that the hash function $h_2(x)$ will generate the same value (corresponding to bucket 210) using either Entry Y or Entry Z as an input value. Moreover, Entry V can be moved from its current location (the bucket 214 of table 204) to its alternative location, namely, bucket 212 of table 202. FIG. 3 depicts the status of the first table 202 and the second table 204 after insertion of Entry X and pushing of Entry Y and Entry Z. As shown, Entry X is now contained in bucket 206. Entry X displaced Entry Y, which has been pushed to bucket 210. In turn, Entry Y displaced Entry Z, which has been pushed to bucket 212. The insertion of Entry X was possible because bucket 212 of table 202 was empty prior to the insertion operation (see FIG. 2). If the cuckoo hash tables are appropriately sized and managed, then enough empty buckets can be maintained to ensure that insertion and other operations do not fail.

Also in the literature are extensions of cuckoo hashing to more than two hash functions and multiple slots per bucket. In practice, the number of hash functions and/or the number of slots per bucket are increased because doing so greatly increases the theoretical and practical performance of the cuckoo hash table.

Conventional techniques related to lookups using a cuckoo hash table relate to manipulation using only one processor device or only one processor core. Thus, conventional techniques accommodate one insert operation, one delete operation, or one lookup operation at a time. Many modern applications, such as wireless switches and network routers, employ multiple processors and/or multiple processor cores. For example, some wireless switch components utilize a 32-core processing architecture for increased speed, capacity, and efficiency. The need exists for a system and related operating methodologies that can accommodate concurrent processing of a cuckoo hash table in a manner that avoids potentially invalid conditions that might arise when two or more processors attempt concurrent operations on the cuckoo hash table.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 and FIG. 3 are diagrams that illustrate pushing of entries in cuckoo hash tables according to prior art principles;

DETAILED DESCRIPTION

Figure 1:
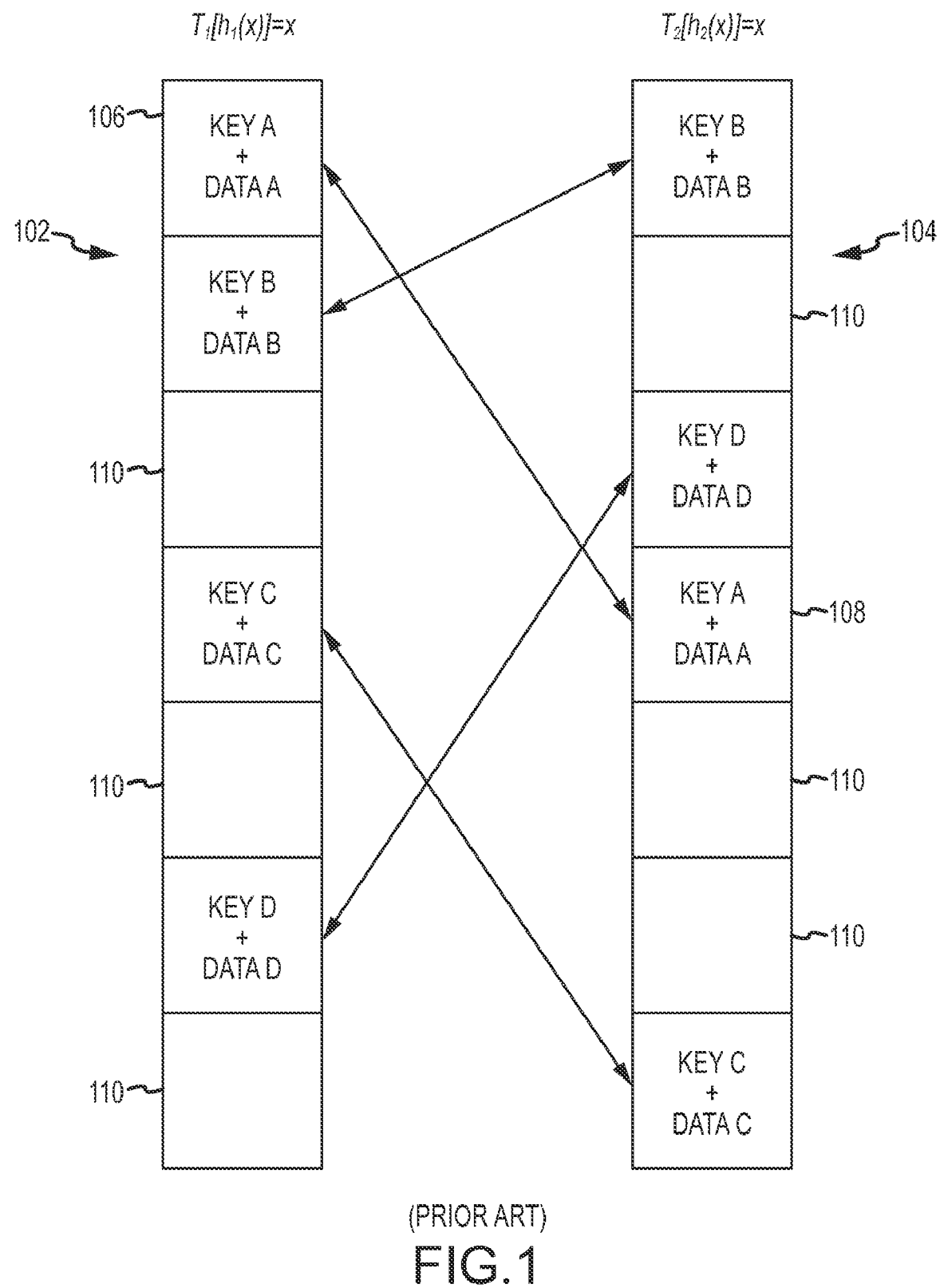
FIG. 1 is a diagram of cuckoo hash tables arranged according to prior art principles.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The system, techniques, and structures described herein can be utilized with a data lookup table that might be subject to concurrent commands and/or operations associated with multiple processors or processor cores. The embodiments described herein are utilized with a cuckoo hash table. In operation, the techniques and methodologies described here prevent invalid conditions associated with concurrent processing of commands (e.g., lookup, delete, insert, and read commands). For example, measures are taken to ensure that an entry can be looked up by one processor even though another processor is concurrently attempting to push that entry. As another example, measures are taken to ensure that an entry can be pushed by one processor even though another processor is concurrently attempting to push that entry. For the sake of brevity, conventional techniques related to data hashing, cuckoo hashing, data processing, data storage and retrieval, and other functional aspects of the systems (and the individual operating components of the systems) may not be described in detail herein.

Figure 4:
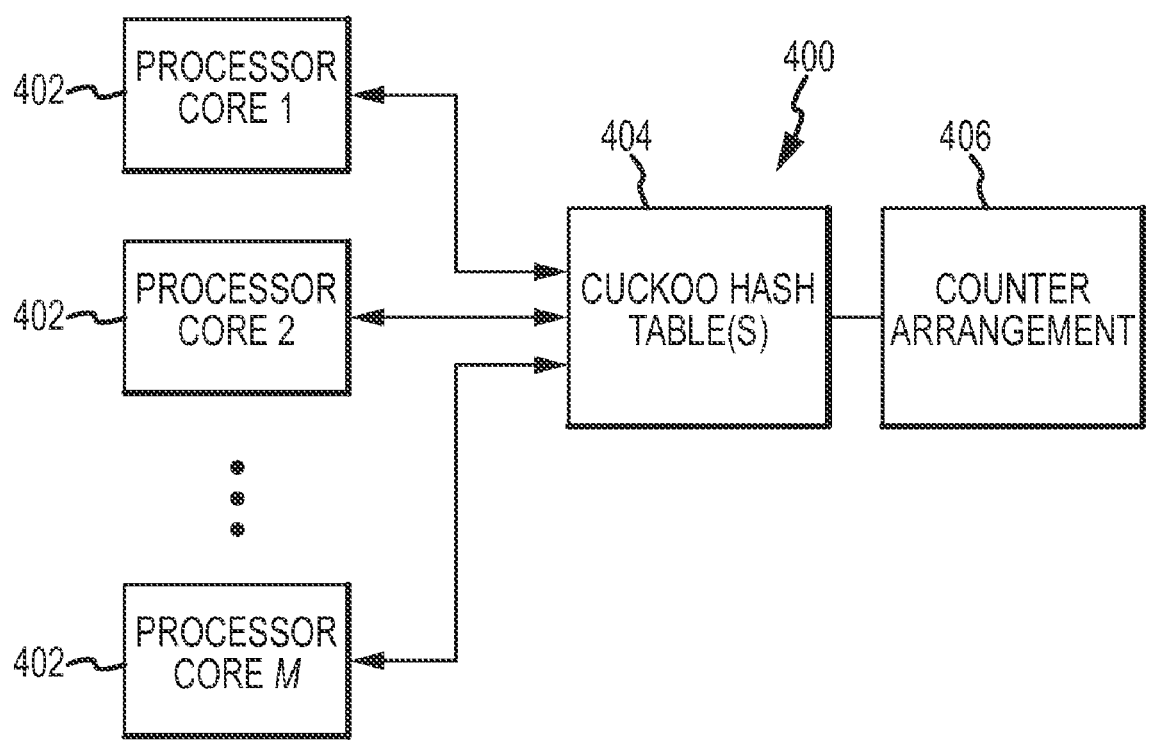
FIG. 4 is a schematic representation of an exemplary lookup table arrangement suitable for use in a computing device having a plurality of processors.

FIG. 4 is a schematic representation of an exemplary lookup table arrangement 400 suitable for use in a computing device having a plurality of processors or processor cores 402. The computing device may be, without limitation: a server computer or blade; a wireless switch device in a wireless local area network; a wireless access device in a wireless local area network; a network router; a component in a cellular communication base station; or the like. The following description may interchangeably refer to a "processor" or a "processor core." Each processor core 402 may be realized as a distinct component or integrated circuit chip, or a plurality of processor cores 402 may be combined in a single component or integrated circuit chip. At least two processor cores 402 concurrently operate in the environment depicted in FIG. 4. A practical deployment may use any number of processor cores 402 (subject to realistic implementation constraints) to suit the needs of the given application. For example, certain wireless switch implementations use 32 concurrent processor cores 402, each of which is operatively coupled to lookup table arrangement 400. In a wireless switch application, lookup table arrangement 400 may be suitably configured for use in connection with firewall flows, forwarding data, mounting data, device information, or the like. In such applications, cuckoo hash table 404 may include a large number of entries, for example, 100,000 or more entries.

The illustrated embodiment of lookup table arrangement 400 includes a cuckoo hash table 404 and a counter arrangement 406 for cuckoo hash table 404. Cuckoo hash table 404 and counter arrangement 406 may be realized using some form of computer readable media. Computer readable media can be any available media that can be accessed by processor cores 402. By way of example, and not limitation, computer readable media may include volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by processor cores 402.

Cuckoo hash tables and the basic functionality and operation thereof are well known to those familiar with data lookup table technologies and, therefore, will not be described in detail here. For example, "Cuckoo Hashing" by Pagh and Rodler, *Proceedings of the 9th European Symposium on Algorithms* (2001), explains cuckoo hash tables in detail, and this article is incorporated by reference herein. As schematically depicted in FIG. 4, cuckoo hash table 404 can be operatively coupled to each of the processor cores 402 to facilitate the transfer of data and/or commands between processor cores 402 and cuckoo hash table 404. Cuckoo hash table 404 and counter arrangement 406 are suitably configured and controlled to support concurrent operation, manipulation, and/or control by processor cores 402. Although counter arrangement 406 is depicted separately from cuckoo hash table 404, it may actually be implemented within cuckoo hash table 404 itself. For example, counter arrangement 406 may be maintained as one or more counter values stored within cuckoo hash table 404. As explained in more detail below, counter arrangement 406 includes or is realized as a plurality of push counters, where each key is associated with a push counter in cuckoo hash table 404. Each push counter is incremented in response to push operations involving its respective key. In practice, one push counter may be associated with each possible key; however, since the number of keys can be extremely large, one push counter is preferably associated with a subset of keys using a hash function as described here.

Figure 5:
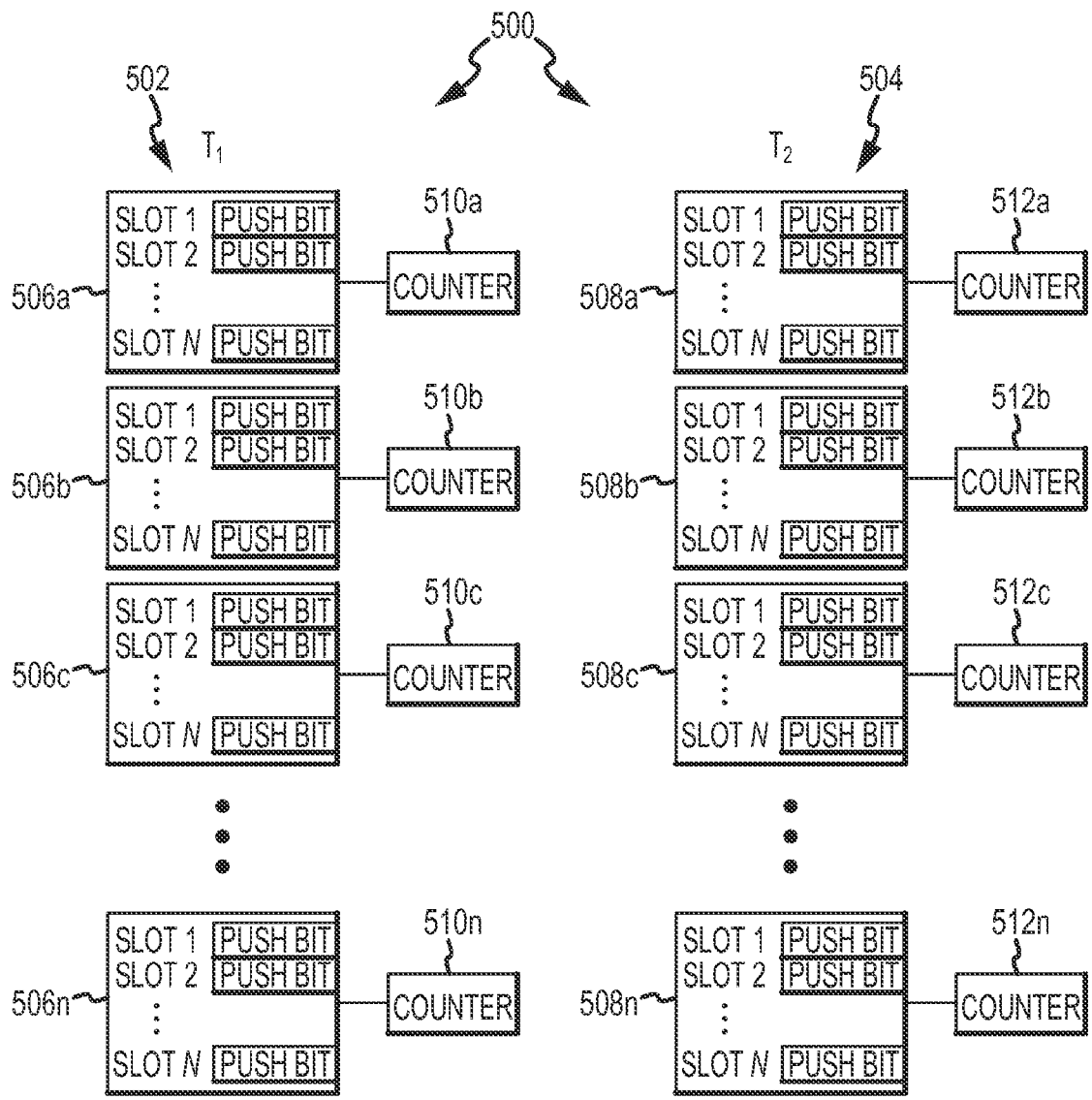
FIG. 5 is a schematic representation of an exemplary cuckoo hash lookup table suitable for use in a computing device having a plurality of processors.

As mentioned briefly above with reference to FIG. 1, a cuckoo hash table accommodates multiple locations or buckets for each key, corresponding to multiple hash functions. The embodiments described here utilize two hash functions, resulting in two cuckoo hash "subtables" and two possible buckets for each entry (including a key along with its respective data item). Alternate embodiments, however, may utilize more than two hash functions, resulting in more than two possible buckets for each entry. Moreover, the examples mentioned above with reference to FIGS. 1-3 assume that each bucket contains a maximum of only one entry, i.e., a key and a respective data item. In practice, however, an embodiment of a cuckoo hash table may contain any number of entries or slots per bucket. For example, FIG. 5 is a schematic representation of an exemplary cuckoo hash table 500 that employs a plurality of slots per bucket. Cuckoo hash table 500 is suitable for use in a computing device having a plurality of processors. Indeed, cuckoo hash table 404 (see FIG. 4) may be configured as shown in FIG. 5.

Cuckoo hash table 500 represents a generalized embodiment where each of the subtables 502 and 504 includes a plurality of buckets for a plurality of entries. Although not necessarily a requirement, the subtables 502 and 504 will typically include the same number of buckets. Thus, subtable 502 includes a respective plurality of buckets 506, and subtable 504 includes a respective plurality of buckets 508. For this embodiment, each bucket in cuckoo hash table 500 includes at least one cell or slot. Although not necessarily a requirement, the buckets 506 and 508 will typically include the same number of slots. In certain embodiments, each bucket in cuckoo hash table 500 includes a plurality of slots. For example, in one practical embodiment, each bucket in cuckoo hash table 500 includes seven slots. As used herein, a slot accommodates an entry in cuckoo hash table 500, where a given entry has at least a corresponding key and a corresponding data item. Moreover, a slot may include, store, or otherwise be associated with a corresponding push flag or push bit (FIG. 5 depicts an implementation where each push flag is realized as a single bit). Alternatively, a push flag may be stored with or within the entry itself. In other words, regardless of how the push flag is implemented or where it is stored, every push operation preferably has a mechanism that signals to other push operations that the new copy of the entry is not to be pushed. Accordingly, each slot represents a possible location for a key in cuckoo hash table 500, and each slot or entry has a respective push flag assigned thereto. A push flag is asserted during a push operation that involves its slot, and assertion of a push flag for a designated entry prevents other processors from concurrently pushing that entry, as described in more detail below. In other words, the push flags represent a measure that prevents invalid conditions associated with concurrent processing of entries.

Notably, because each bucket in cuckoo hash table 500 may include a plurality of slots, at any given time a bucket may contain a plurality of different keys along with their respective data items. For example, assuming N slots per bucket, the hash function for subtable 502 may be suitably configured to generate the same hash value (which serves as an identifier or locator for one of the buckets 506 in subtable 502) for at least N different keys. Thus, when searching for a particular key, a processor may need to search through N slots per bucket.

As mentioned previously, each key in cuckoo hash table 500 may be associated with a corresponding push counter that keeps track of push operations involving its key. For example, a push counter can be associated with its key using a suitable hash function. Moreover, in one desirable implementation, the system reuses the hash function that associates a key to a bucket. In other words, the same hash functions corresponding to subtables 502 and 504 can be utilized to assign push counters to their respective keys (which are stored in subtables 502 and 504 in a manner influenced by the hash functions). In this regard, FIG. 5 depicts a plurality of respective push counters 510 for buckets 506 in subtable 502, and a plurality of respective push counters 512 for buckets 508 in subtable 504. The memory for a push counter may be realized with the memory utilized for a subtable, a bucket, and/or in a separate location that is associated with or assigned to cuckoo hash table 500. In certain embodiments, the mapping of a key to its push counter is controlled such that the push counter is associated with one of the two possible buckets for the key (e.g., the first bucket). This feature is desirable because it reuses the memory access that is used to fetch the first bucket for a key during operations.

For this particular embodiment, a push counter changes (i.e., is incremented) in response to a push operation that involves its key/entry. As described in more detail below, a push counter for a designated key can be analyzed by a first processor to determine whether a second processor has pushed the designated key and its entry during a lookup or delete operation performed by the first processor. In other words, the push counter represents a measure that prevents invalid conditions associated with concurrent processing of the entry.

A number of techniques, measures, and processes can be utilized to ensure that invalid or inconsistent conditions and operations are minimized or prevented in a system having a cuckoo hash table that is subject to manipulation and/or control by a plurality of concurrent processors. Generally, the system is suitably configured to process a first command for a first concurrent processor, and to prevent invalid conditions associated with concurrent processing of a second command for a second concurrent processor. In such a system environment, certain safeguarding or protective procedures can be performed during the execution of lookup, delete, read, and insert commands that involve entries for the cuckoo hash table, where such commands may represent concurrent commands from multiple processors. These commands and operations are described in separate sections below.

Push Commands

Figure 6:
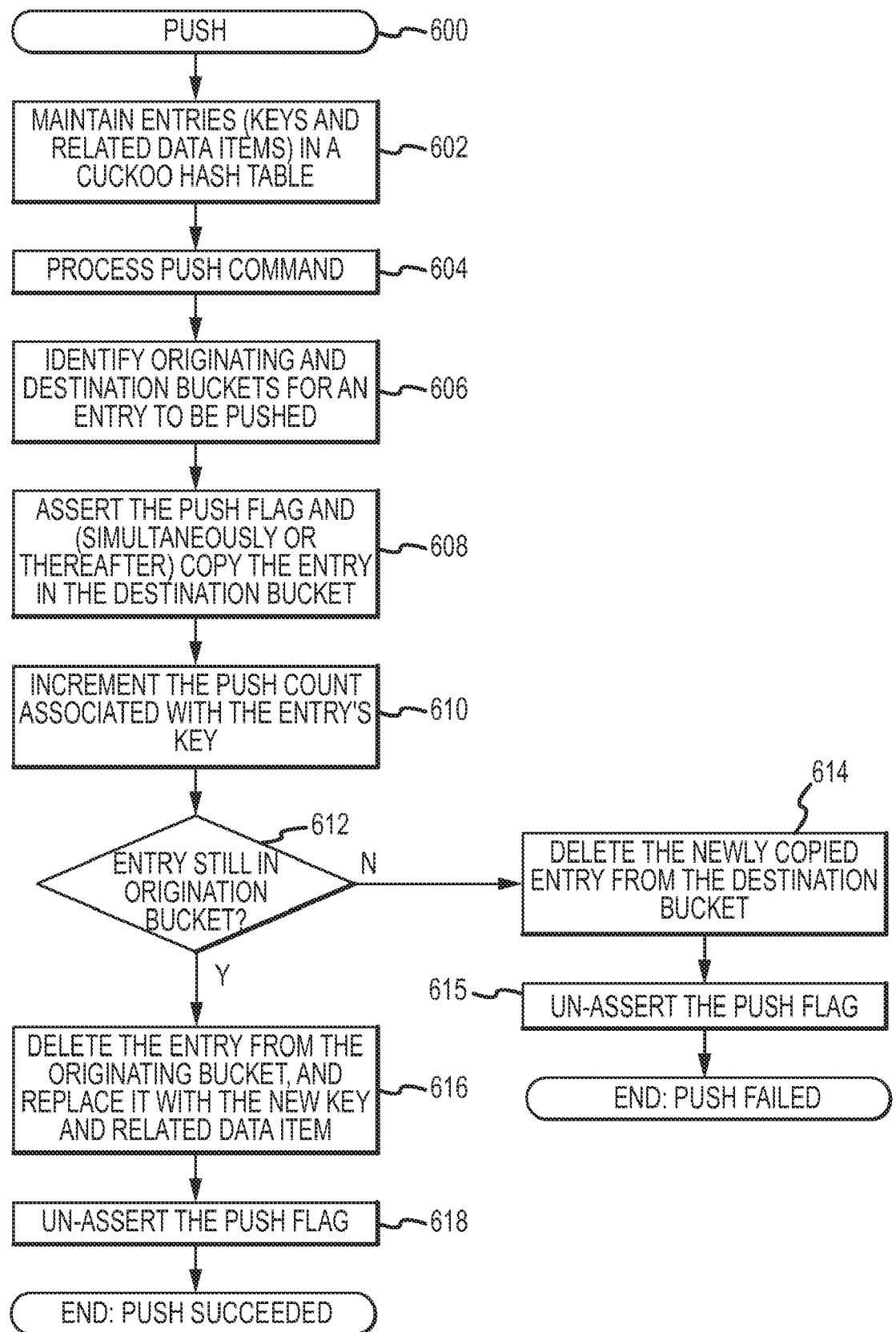
FIG. 6 is a flow chart that illustrates an embodiment of a lookup table push process suitable for use in a concurrent processing environment.

Under certain operating conditions, there might be more than one concurrent push operation (under the control of different processors) attempting to push an entry from one of its buckets to another one of its buckets. Such a concurrent push scenario represents a race condition that ought to be managed to avoid conflicts, invalid conditions, or errors. In this regard, FIG. 6 is a flow chart that illustrates an embodiment of a lookup table push process 600 suitable for use in a concurrent processing environment. The various tasks performed in connection with process 600 may be performed by software, hardware, firmware, or any combination thereof. For illustrative purposes, the following description of process 600 may refer to elements mentioned above in connection with FIGS. 4 and 5. In practice, portions of process 600 may be performed by different elements of the described system, e.g., a processor or processor core, a push counter, etc. It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein.

Process 600 begins with (or assumes that) a plurality of entries are maintained in the cuckoo hash table, where an entry includes, without limitation, a respective key and its related data item (task 602). A push command for a designated entry can then be processed (task 604). In certain embodiments, the push command includes, indicates, or conveys a key to be hashed. In practice, a push command is typically carried out in response to an insert command, where a new entry is being inserted into the cuckoo hash table. As explained above, one or more push operations may be required to make room for the new entry. In connection with the push operation, process 600 identifies an originating bucket and a destination bucket for the designated entry to be pushed (task 606). Task 606 refers to the hashing of a designated key using the cuckoo hashing functions, resulting in two hash values corresponding to the locations or identifiers of the originating and destination buckets. In this regard, process 600 identifies the originating and destination buckets based upon the key.

For simplicity, process 600 assumes that the destination bucket is able to accommodate another entry. If, however, the destination bucket is full, then another instance of process 600 can be initiated in an attempt to push an entry from the destination bucket to yet another bucket. This second push operation must finish before the first push operation occurs, thus, multiple instances of process 600 may be performed in a nested fashion to push a given entry. Eventually, process 600 asserts the push flag associated with designated entry and copies the designated entry (which includes a key and a related data item) in the destination bucket (task 608). In practice, the push flag can be asserted before the entry is copied, or it can be asserted simultaneously with the copying of the entry. For an embodiment having multiple slots per bucket, task 608 copies the designated entry into an available slot in the destination bucket. In practice, the assertion of the push flag occurs simultaneously or concurrently with the writing of the designated entry in the destination bucket. Notably, at this time a copy of the designated entry still remains in the origination bucket. The asserted push flag, which may be a single bit in certain embodiments, prevents other processors from pushing the newly copied entry out of the destination bucket. In other words, an asserted push flag serves as an indicator to other processors that the newly copied entry has been temporarily frozen in its current location. Consequently, an entry cannot be moved from its current location unless its respective push flag is de-asserted.

Process 600 will then increment the push counter associated with the key of the designated entry (task 612). For this embodiment, a push counter for a given key is incremented whenever that key (and, in turn, its related data item) is pushed from one bucket to another. Notably, if key k is associated with a push counter stored in each bucket, and the hash function to map k to the push counter is $h_1(\ )$, then the push counter associated with key k is the one in the first bucket for k, i.e., $T_1[h_1(k)]$. The push counter may be changed by any amount in response to a push operation because, as described below, a lookup or delete process need not analyze the actual counter value—it merely determines whether or not the counter value has changed. In practice, the push counter should be configured to maintain a sufficiently long count before rolling over, such that it will accurately indicate any number of push operations between sampling times. In other words, the push counter is suitably configured such that the counter value will not roll over to its initial value during a stated interval of time (otherwise, it will falsely indicate that no push operations have occurred). The significance of the push counter and push count values will be described in more detail below with reference to FIG. 7.

After copying the designated entry into its destination bucket, process 600 determines whether the designated entry still remains in its origination bucket (query task 612). If the designated entry no longer exists in its originating bucket, then process 600 will delete the newly copied entry from the destination bucket (task 614). In other words, process 600 deletes the copy of the designated entry that it created during task 608. At this time, process 600 will also clear or un-assert the push flag (task 615) that was asserted during task 608. Clearing of the newly copied entry in this manner represents a failed push operation, and process 600 ends. The delete operation of task 616 is performed at this time because either: (1) the designated entry has been deleted from the originating bucket by another concurrent processor; or (2) the designated entry has been successfully pushed by another concurrent processor from the originating bucket to the destination bucket (e.g., to a different slot in the destination bucket or to a different destination bucket if the number of hash functions is greater than two). In both of these scenarios the copy of the designated entry created during task 608 is superfluous and, therefore, it should be rolled back or deleted.

If query task 612 finds the designated entry in its originating bucket, then process 600 will delete it from the originating bucket and replace it with a new entry, which includes a new key and its related data item (task 616). Notably, this delete operation is performed after asserting the push flag in the destination bucket for the designated entry. After deleting the designated entry from its originating bucket and writing the new entry, process 600 can un-assert the destination bucket push flag assigned to the designated entry (task 618). As a result, the state of the push flag changes to indicate to other processors that the designated entry can now be pushed from the destination bucket. This represents a successful push operation, and process 600 ends.

Notably, process 600 can be implemented such that multiple processors can independently perform push operations without having to use lockouts. One non-limiting implementation of a process for handling concurrent push operations can be represented by the following pseudo-code:

```
push (bucket, new_value, depth):
    for each slot in bucket:
        while slot is empty:
            // empty buckets cannot be pushed, but can be filled
            if CAS(&slot, NULL, new_value):
                return slot
        slot_val = *slot
```

-continued

```
if slot_val is marked with PUSH bit:
        continue // do not attempt to push this slot
bucket0, bucket1 = hash (slot key)
new_bucket = bucket == bucket0 ? bucket1 : bucket0
if depth == 0:
    for each slot2 in new_bucket:
        if slot2 is empty:
            if CAS(&slot2, NULL, slot_val | PUSH:
                WRITE_MEMORY_BARRIER( ) // make sure
CAS happens before increment of push count
                atomic_increment (bucket0->push_count)
                WRITE_MEMORY_BARRIER( ) // make sure
second CAS happens after increment of push count
                if CAS(&slot slot_val, new_value):
                    // remove the PUSH bit and complete
                    CAS(&slot2 slot_val | PUSH, slot_val)
                    return slot
                else:
                    // something happened to slot_val (other
push or delete); roll back
                    CAS(&slot2 slot_val | PUSH, NULL)
    else:
        slot2 = push(new_bucket, slot_val | PUSH, depth–1)
        if slot2:
            // the contents of slot2 have been pushed elsewhere and
slot_val | PUSH put in its place
            <same as above starting at the first
WRITE_MEMORY_BARRIER( )>
    return NULL
```

Lookup Commands

Figure 7:
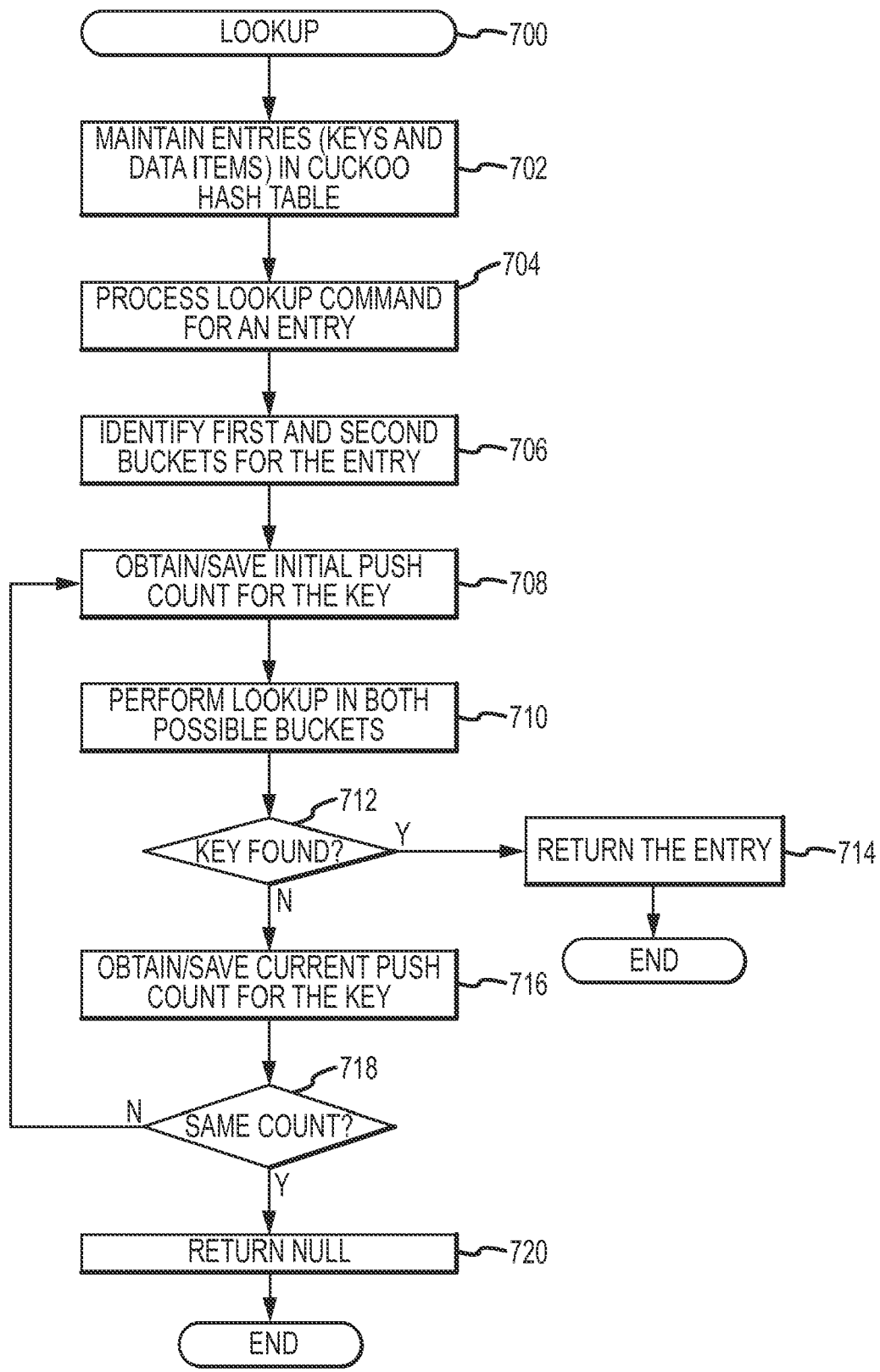
FIG. 7 is a flow chart that illustrates an embodiment of a lookup process suitable for use in a concurrent processing environment.

Under certain operating conditions, there might be a lookup operation (under the control of one processor) attempting to read a designated entry while a concurrent push operation (under the control of another processor) is attempting to push the designated entry. Such a concurrent processing scenario represents a race condition that ought to be managed to avoid conflicts, invalid conditions, or errors. In this regard, FIG. 7 is a flow chart that illustrates an embodiment of a lookup process 700 suitable for use in a concurrent processing environment. The various tasks performed in connection with process 700 may be performed by software, hardware, firmware, or any combination thereof. For illustrative purposes, the following description of process 700 may refer to elements mentioned above in connection with FIGS. 4 and 5. In practice, portions of process 700 may be performed by different elements of the described system, e.g., a processor or processor core, a push counter, etc. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein.

In certain embodiments, lookup operations are performed without having to write "background" or temporary entries into the cuckoo hash table, which are typically required when performing lookup operations in conventional architectures. Accordingly, the lookup operation described in the context of process 700 does not write any values. Process 700 can be performed to identify when a reader (i.e., a processor attempting to perform a lookup operation) could be competing with a concurrent pusher (i.e., a processor attempting to perform a push operation on the same entry). If, for example, one processor pushed a designated entry from bucket B to bucket A while a second processor scanned buckets A and B, the second processor could have missed the designated entry entirely. An important time period is when a pusher has copied the designated entry in bucket A but not yet removed the designated entry from bucket B. If the reader scans buckets A and B before or after that time period, then the reader will always find at least one of the copies. Otherwise, there is no such certainty.

Process 700 attempts to resolve the above race condition by maintaining a count of how may times a designated entry has been pushed. The count is updated by each pusher at the halfway point of the push operation, namely, after the designated entry has been copied into its destination bucket but before it has been deleted from its originating bucket. A reader will sample this count before and after scanning the buckets. If the count changed during the scan, then the reader may have raced with a pusher. Accordingly, the reader may repeat the scan until the count has not changed.

Referring again to FIG. 7, process 700 begins with (or assumes that) a plurality of entries are maintained in the cuckoo hash table, where an entry includes, without limitation, a respective key and its related data item (task 702). A lookup command for a designated entry can then be processed (task 704). In certain embodiments, the lookup command includes, indicates, or conveys a key to be hashed. In connection with the lookup operation, process 700 identifies at least a first bucket and a second bucket for the designated entry (task 706). Task 706 refers to the hashing of a designated key using the cuckoo hashing functions, resulting in at least two hash values corresponding to the locations or identifiers of the originating and destination buckets. For this particular embodiment, two cuckoo hashing functions are used, resulting in two buckets for the designated entry.

Process 700 can then obtain or save an initial push count for the key (task 708). For each entry, the system may consider one of the two possible buckets as the "first" or "primary" or "default" bucket for purposes of process 700. For purposes of this description, task 708 obtains the initial push count for the key corresponding to the designated entry. Note that the push counter being monitored is the counter which would be incremented by another push operation pushing the same key. After obtaining this initial push count, process 700 performs a lookup operation for the designated entry in the first bucket and the second bucket (task 710). A lookup for a designated entry involves searching the two buckets for the key corresponding to the designated entry. This is possible because the key itself represents the input to the two cuckoo hashing functions and because the key itself is stored with its respective data item.

If the designated key is found in one of the two buckets (query task 712), then process 700 can proceed in an appropriate manner. For example, if the designated key is found, then process 700 will return the found entry (or at least some of the data corresponding to the found entry) to the appropriate processor or processor core (task 714). After completion of task 714, process 700 may exit or it may be repeated (or re-entered at an appropriate location) to accommodate another lookup command.

If the designated key is not found in the identified buckets (query task 712), then process 700 obtains or saves a current push count for the key (task 716). As described above with reference to FIGS. 4-6, a push counter for a key can be utilized to keep track of push operations that involve that particular key. In certain embodiments, the push count will remain unchanged if no entries whose key is associated with that push counter have been pushed. Otherwise, the push count will have been incremented by some amount. In practice, a push could happen to or from the first bucket. Moreover, if there are more than two buckets for a key, then a push could happen between two other buckets. For the embodiment depicted in FIG. 5, each key's push counter is incremented whenever it is pushed from its entry (slot) in the respective bucket.

If the current push count is the same as the initial push count (query task 718), then process 700 returns a null value to the appropriate processor or processor core (task 720). In other words, the result of a lookup command will be a null value if the designated key is not found in the buckets and if the current push count is the same as the initial push count. This is a valid "not found" result because the stable push count confirms that the designated entry of interest has not been pushed during the time period that the processor has searched the possible buckets for that entry. After completion of task 720, process 700 may exit or it may be repeated (or re-entered at an appropriate location) to accommodate another lookup command.

If the current push count is different than the initial push count, then process 700 may be re-entered at task 708 to repeat the scanning routine. Rescanning the buckets in this manner is desirable because the different push count indicates that the designated entry may have been pushed during the time period that the processor has searched the possible buckets for that entry. In other words, the fact that the key was not found may be attributable to a concurrent push operation rather than an actual "not found" condition. Thus, tasks 708, 710, 712, 716, and 718 can be repeated until the designated key is found (query task 712) or the current push count is the same as the initial push count (query task 718).

Notably, process 700 can be implemented such that multiple processors can independently perform lookup and push operations without having to use lockouts. One non-limiting implementation of a process for handling concurrent lookup and push commands can be represented by the following pseudo-code:

```
lookup(key):
    bucket0, bucket1 = hash(key)
    do:
        push_count = bucket0->push_count
        READ_MEMORY_BARRIER( ) // reading push_count
    must occur before looking in slots [ ]
        for each slot in each bucket:
            if slot matches key:
                return matching key's item
        READ_MEMORY_BARRIER( ) // second read of push_count
    must occur after looking in slots [ ]
        while push_count != bucket0->push_count
    return NULL
```

Insert Commands

Concurrent insert commands of the same key can be handled in a conventional manner, e.g., using spinlock techniques or any suitable blocking technique. For example, an inserter (i.e., a processor or processor core carrying out an insert command) will be able to complete its insert operation into the cuckoo hash table while all other concurrent processors are held in a standby mode. Once the current insert operation is complete, the spinlocks are removed. This technique eliminates the possibility of a race condition between two concurrent insertion operations for the same key.

In certain embodiments, another bit per slot can be added to function as an "insert" bit or flag, and another counter per key can be added to function as an insertion counter. The insert flag and insertion counter could then be used in a manner similar to that described above for push flags and push counters, but in the context of preventing simultaneous insert operations.

One non-limiting implementation of a process for handling concurrent insert commands can be represented by the following pseudo-code:

```
insert(key):
    bucket0,bucket1 = hash(key)
    <similar loop as a lookup, but also keep track of how may free
slots are in each bucket>
    <if a match is found, return it rather than insert the new key>
    bucket = <bucket0 or bucket1, whichever has more free slots,
    favor bucket0 if tied>
    for each slot in bucket:
        if slot is empty:
            if CAS(&slot, NULL, key):
                return inserted item
    // cannot insert into least loaded bucket. use push( ) to make room
    for depth in 0...MAX_PUSH_DEPTH-1:
        for each bucket in bucket0,bucket1:
            if push(bucket, key, depth):
                return inserted item
    // table is too full
    return NULL
```

Delete Commands

Delete operations are relatively straightforward, and they closely follow the lookup routine described above in connection with process 700 (see FIG. 7). Indeed, under certain operating conditions, there might be a delete operation (under the control of one processor) attempting to read a designated entry while a concurrent push operation (under the control of another processor) is attempting to push the designated entry. Such a concurrent processing scenario represents a race condition that ought to be managed to avoid conflicts, invalid conditions, or errors. In concurrent cuckoo hash table embodiments, a delete operation will scan all of the buckets for the to-be-deleted entry, and thereafter remove all matching entries. To accomplish this, a delete operation can continue to search the buckets for the target entry until the push count associated with the particular key ceases to change while the delete operation is searching the buckets (similar to the lookup operation described above). This additional measure ensures that any redundant copies of the designated entry, which may have resulted from concurrent processing of other commands, are successfully removed from the cuckoo hash table.

Figure 8:
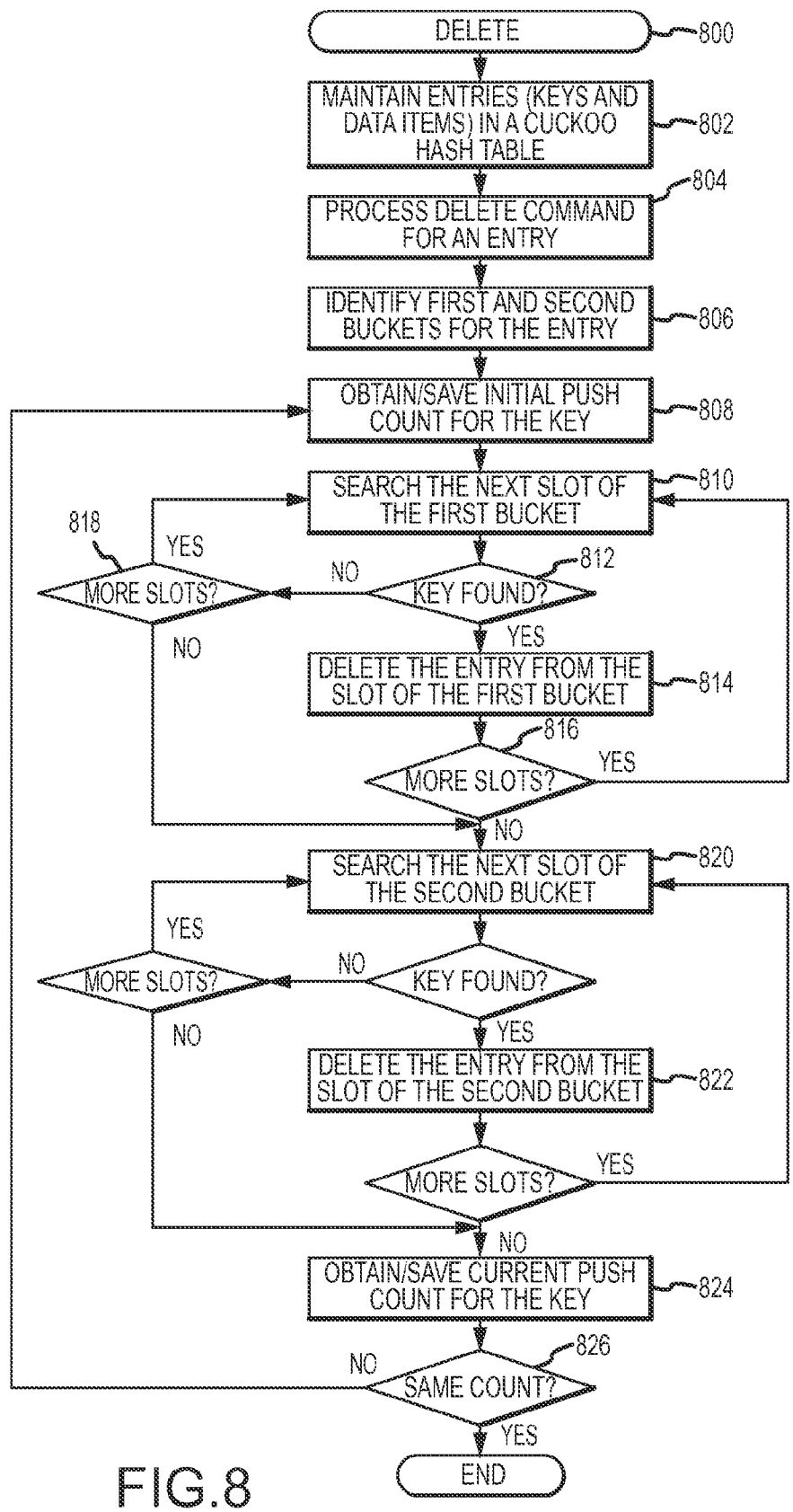
FIG. 8 is a flow chart that illustrates an embodiment of a delete process suitable for use in a concurrent processing environment.

FIG. 8 is a flow chart that illustrates an embodiment of a delete process 800 suitable for use in a concurrent processing environment. The various tasks performed in connection with process 800 may be performed by software, hardware, firmware, or any combination thereof. For illustrative purposes, the following description of process 800 may refer to elements mentioned above in connection with FIGS. 4 and 5. In practice, portions of process 800 may be performed by different elements of the described system, e.g., a processor or processor core, a push counter, etc. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

Process 800 can be performed to identify when a reader (i.e., a processor attempting to perform a delete operation) could be competing with a concurrent pusher (i.e., a processor attempting to perform a push operation on the same entry). A number of the tasks associated with process 800 are similar to tasks described above for lookup process 700. For the sake of brevity and simplicity, such common or similar tasks will not be redundantly described in detail in the context of process 800.

Process 800 maintains entries in the cuckoo hash table (task 802), and handles a delete command for a designated entry (task 804). In certain embodiments, the delete command includes, indicates, or conveys a key to be hashed. In connection with the delete operation, process 800 identifies at least a first bucket and a second bucket for the designated entry (task 806), and obtains or saves the initial push count for the key (task 808) as described above for process 700. After obtaining the initial push count for the designated key, process 800 searches for all instances of the designated entry. In this example, process 800 searches all of the slots of the first and second buckets for the designated entry. In this regard, process 800 may search a slot of the first bucket in an attempt to find the designated entry (task 810). If the designated key is found in the slot (query task 812), then process 800 proceeds in an appropriate manner.

FIG. 8 depicts an embodiment where process 800 deletes the found entry from the slot in the first bucket (task 814). Thereafter, if more slots in the first bucket need to be searched (query task 816), then process 800 will return to task 810 to search the next slot of the first bucket. Otherwise, process 800 can proceed to search the slots in the second bucket (task 820). If the designated key is not found in the slot (query task 812), then process 800 will proceed to search the next slot in the first bucket (if more slots need to be searched) or it will proceed to search the slots in the second bucket (if it has already searched all of the slots in the first bucket). Query task 818 illustrates how process 800 can perform one of these two options.

After all of the slots in the first bucket have been searched and all instances of the entry have been deleted from the first bucket, process 800 proceeds to task 820, as depicted in FIG. 8. It should be appreciated that process 800 might be implemented such that both buckets are searched concurrently rather than in a sequential manner as depicted in FIG. 8. Indeed, as long as the push count is initialized before searching the buckets, and is thereafter resampled after all buckets have been searched, the slots in the buckets can be searched concurrently or in any sequence, and process 800 need not search all of the slots in one bucket before beginning to search the slots in another bucket. That said, for the illustrated embodiment, task 820 initiates the search of the second bucket in the manner described above for the first bucket. Accordingly, each time the second searching operation finds the designated key in a slot of the second bucket, then process 800 will delete the found entry from that slot of the second bucket (task 822). It should be appreciated that more than two buckets may be searched in this manner to accommodate implementations where the cuckoo hash table contains more than two possible locations for a key.

After all of the slots in the second bucket have been searched and all instances of the designated entry have been deleted from the second bucket, process 800 obtains or saves the current push count for the key (task 824). Note that task 824 will be performed even if the designated key is not found in either the first bucket or the second bucket. As described above, the push counter for the designated key keeps track of push operations that involve that particular key. Thus, task 824 is performed to check whether any other concurrent push operations have moved any entries targeted for deletion during process 800. Thus, if the current push count is the same as the initial push count (query task 826), then the delete operation was successful and process 800 ends. On the other hand, if the current push count is different than the initial push count, then process 800 may be re-entered at task 808 to reinitialize the push count and repeat the procedure described above. Rescanning in this manner is desirable because the different push count indicates that the designated entry may have been pushed during the time period that the processor has searched the possible buckets/slots for that entry. Thus, the loop generally defined between task 808 and task 826 can be repeated until the current push count is the same as the initial push count (query task 826).

Notably, process 800 can be implemented such that multiple processors can independently perform delete and push operations without having to use lockouts. One non-limiting implementation of a process for handling delete commands can be represented by the following pseudo-code:

```
delete(key):
    bucket0,bucket1 = hash(key)
    do:
        push_count = bucket0->push_count
        READ_MEMORY_BARRIER( )
        for each slot in each bucket:
            if slot contains key:
                CAS(&slot, key, NULL)
        READ_MEMORY_BARRIER( )
    while push_count != bucket0->push_count
```

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing entries in a cuckoo hash table that is subject to manipulation by a plurality of concurrent processors, the method comprising:

maintaining a plurality of keys, along with their respective data items, in the cuckoo hash table configured to support concurrent operation by the plurality of processors without using lockouts, each data item having an associated push flag;

processing a first push command for the cuckoo hash table to move a data item from one location in the cuckoo hash table designated by a key to another location in the cuckoo hash table designated by the key, the first push command being associated with a first processor of the plurality of concurrent processors, the first command asserting the push flag of the data item being pushed;

preventing concurrent processing of a second push command for the data item without using lockouts, wherein the second push command is associated with a second processor of the plurality of concurrent processors, by recognizing that the push flag is being asserted, wherein the first process to continues moving the data item while the push flag is being asserted, and wherein the second processor looks up the data item while the first processor is concurrently attempting to move that data item;

wherein the processing includes associating the designated key with a push counter, wherein the push counter is changed in response to each push command involving the designated key; and wherein the preventing includes analyzing, by the second processor, the push counter of the designated key for a change by the first processor, which indicates an invalid condition associated with concurrent processing of a second push command for the entry.

2. The method of claim 1, wherein the preventing step comprises:
identifying, based upon the designated key, an originating bucket and a destination bucket in the cuckoo hash table, wherein the asserting a push flag is associated with the entry in the destination bucket;
copying the entry in the destination bucket;
deleting the entry from the originating bucket, after asserting the push flag; and
un-asserting the push flag, after deleting the entry from the originating bucket.

3. The method of claim 2, wherein deleting the entry from the originating bucket comprises replacing the entry with a new entry.

4. The method of claim 2, wherein the preventing step comprises:
identifying, based upon the designated key, an originating bucket and a destination bucket in the cuckoo hash table;
copying the entry in the destination bucket,
wherein the push flag is associated with the entry in the destination bucket; and
thereafter, if the entry no longer exists in the originating bucket, deleting the entry from the destination bucket.

5. In a computing device having a plurality of processors configured for concurrent operation, a lookup table arrangement comprising:
a cuckoo hash table coupled to each of the plurality of processors, and configured to support concurrent operation by the plurality of processors, the cuckoo hash table comprising a plurality of buckets for a plurality of entries, each comprising a respective key and a respective data item;
at least one slot in each of the plurality of buckets, each slot representing a possible entry location in the cuckoo hash table, and each slot having a respective push flag assigned thereto;
a push flag is asserted during a first push operation of a first processor that involves its slot,
wherein the push operation serves to move a data item from one location in the cuckoo hash table designated by a key to another location in the cuckoo hash table designated by the key, and wherein assertion of the push flag prevents concurrent processing of a second push operation of a second processor for the data item, by having the second processor recognize that the push flag is being asserted,
wherein the first process is operable to continue moving the data item while the push flag is being asserted, and wherein the second processor is able to look up the data item while the first processor is concurrently attempting to move that data item; and
wherein a push counter for a designated key is analyzed by a first processor of the plurality of processors to determine whether a second processor of the plurality of processors has pushed the designated key during a lookup operation performed by the first processor.

6. The lookup table arrangement of claim 5, wherein assertion of a push flag for a designated entry occurs when the push operation has copied the designated entry in the slot assigned to the push flag, and wherein the push flag is un-asserted after deleting the entry from an originating bucket.

7. The lookup table arrangement of claim 5, wherein assertion of a push flag for a designated entry occurs when the push operation has copied the designated entry in the slot assigned to the push flag.

* * * * *

UNITED STATES PATENT AND TRADEMARK OFFICE
CERTIFICATE OF CORRECTION

PATENT NO. : 8,271,564 B2
APPLICATION NO. : 12/172780
DATED : September 18, 2012
INVENTOR(S) : Dade It is certified that error appears in the above-identified patent and that said Letters Patent is hereby corrected as shown below:

On the Title Page, in Item (56), under "OTHER PUBLICATIONS", in Column 2, Line 9, delete "M..," and insert -- M., --, therefor.

On the Title Page, in Item (56), under "OTHER PUBLICATIONS", in Column 2, Line 13, delete "Report,PCT" and insert -- Report, PCT --, therefor.

In Column 4, Line 55, delete "(DVD)" and insert -- (DVDs) --, therefor.

In Column 12, Line 8, delete "may" and insert -- many --, therefor.

In Column 14, Line 59, in Claim 1, after "process" delete "to".

In Column 15, Line 9, in Claim 2, after "wherein the" delete "asserting a".

Signed and Sealed this
Fifth Day of February, 2013

Teresa Stanek Rea
*Acting Director of the United States Patent and Trademark Office*